(12) United States Patent
Horne

(10) Patent No.: US 8,255,164 B2
(45) Date of Patent: *Aug. 28, 2012

(54) METHODS AND SYSTEMS FOR BOREHOLE SEISMIC

(75) Inventor: Stephen Allan Horne, Shibuya-Ku (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 546 days.

This patent is subject to a terminal disclaimer.

(21) Appl. No.: 12/428,451

(22) Filed: Apr. 22, 2009

(65) Prior Publication Data

US 2010/0274489 A1    Oct. 28, 2010

(51) Int. Cl.
*G01V 1/40* (2006.01)

(52) U.S. Cl. .................. 702/11; 702/6; 702/14; 702/18

(58) Field of Classification Search ............... 702/6, 11, 702/14

See application file for complete search history.

(56) References Cited

U.S. PATENT DOCUMENTS

| | | | | |
|---|---|---|---|---|
| 2,637,839 | A | | 5/1953 | Piety |
| 4,446,541 | A | | 5/1984 | Cowles |
| 6,021,379 | A | * | 2/2000 | Duren et al. ............ 702/16 |
| 6,714,870 | B1 | * | 3/2004 | Weston et al. ............ 702/9 |
| 6,748,330 | B2 | * | 6/2004 | Leaney ............ 702/14 |
| 7,286,442 | B2 | * | 10/2007 | Ray et al. ............ 367/15 |
| 2003/0179651 | A1 | * | 9/2003 | Nutt et al. ............ 367/25 |
| 2005/0033476 | A1 | * | 2/2005 | Horne et al. ............ 700/250 |
| 2005/0150655 | A1 | * | 7/2005 | Duong et al. ............ 166/249 |
| 2006/0077757 | A1 | * | 4/2006 | Cox et al. ............ 367/25 |
| 2006/0153005 | A1 | * | 7/2006 | Herwanger et al. ............ 367/38 |
| 2007/0153631 | A1 | * | 7/2007 | Menard et al. ............ 367/178 |
| 2010/0195439 | A1 | * | 8/2010 | Muyzert ............ 367/56 |

FOREIGN PATENT DOCUMENTS

| | | |
|---|---|---|
| WO | 2007/074168 | 7/2007 |
| WO | 2008/064100 | 5/2008 |

OTHER PUBLICATIONS

Miller, D. E., and Spencer, C., 1994, "An exact inversion for anisotropic moduli from phase slowness data", J. Geophys. Res., 99, 21651-21657.

Esmersoy, C., 1990, "Inversion of P and SV waves from multicomponent offset vertical seismic profiles", Geophysics, 55 (1) 39-50.

Leaney, W. S., 2002, "Anisotropic vector plane wave decomposition for 3D VSP data", SEG, Expanded Abstracts, 21 (1), 2369-2372.

Alford, 1986, "Shear Data in the Presence of Azimuthal Anisotropy", SEG, Expanded Abstracts.

(Continued)

*Primary Examiner* — Jonathan C Teixeira Moffat
*Assistant Examiner* — Mischita Henson
(74) *Attorney, Agent, or Firm* — Jianguang Du; Jody DeStefanis

(57) ABSTRACT

Methods and systems for determining reservoir parameters of subterranean formations. A tool is configured or designed for deployment at at least one depth in a borehole traversing a subterranean formation. The tool comprises at least one sensor configured or designed for sensing rotational components of a seismic wavefield deployed in an array comprising at least one sensor configured or designed for sensing translational components of a seismic wavefield. A computer is in communication with the tool and a set of instructions executable by the computer that, when executed, process the seismic measurements and derive parameters relating to the formation based on the seismic measurements.

23 Claims, 10 Drawing Sheets

OTHER PUBLICATIONS

Igel, H., Flaws, A., Suryanto, W., Schuberth, B., Cochard, A., Schreiberg, U., Velikosoltsev, A., 2004, "Rotational Motions in Seismology: Theory, Instrumentation and Observations", FGS Workshop on Ring Lasers and Earth Rotations, Wettzell, Germany Mar. 24-25.

* cited by examiner

METHODS AND SYSTEMS FOR BOREHOLE SEISMIC

BACKGROUND

The present disclosure relates generally to methods and systems for performing borehole seismic surveys relating to subterranean formations. More specifically, some aspects disclosed herein are directed to methods and systems for acquiring and processing seismic measurements in a borehole for characterizing subterranean formations having oil and/or gas deposits therein. The borehole seismic measurements include rotational and translational seismic wavefield components.

Seismic exploration can provide valuable information useful in, for example, the drilling and operation of oil and gas wells. Seismic measurements of the type described herein may also be used for a wide variety of purposes that are known in the fields of passive and active seismic monitoring. In seismic exploration, energy is introduced by a seismic source, for example, an active or a passive source of seismic energy, to create a seismic signal that propagates through the subterranean formation. This seismic signal is modified to differing degrees by features that are of interest. A receiver acquires the seismic signals to help generate a seismic map of the underground features. As a practical matter, the system may comprise a plurality of sources and receivers to provide a comprehensive map of subterranean features. Different configurations may yield two dimensional or three dimensional results depending on their mode of operation.

There is a need, however, for improving the currently available techniques for acquiring and processing borehole seismic measurements. One object of the present disclosure is to provide improved techniques for deriving formation parameters by acquiring seismic measurements in a borehole comprising rotational and translational components of a seismic wavefield.

SUMMARY OF THE DISCLOSURE

The disclosure herein may meet at least some of the above-described needs and others. In consequence of the background discussed above, and other factors that are known in the field of formation analysis, the applicant recognized the need for methods and systems for acquiring and processing seismic measurements for purposes of monitoring subterranean formations in a reliable, efficient manner. In this, the applicant recognized that techniques were needed that could eliminate, or at least reduce, shortcomings that are inherent in the conventional methods and systems for borehole seismic, in particular, Vertical Seismic Profile (VSP) type surveys.

Applicant recognized that rotational seismology techniques may be utilized in borehole environments. The applicant further recognized that evolving rotational sensor technology could be advantageously adapted and utilized in borehole environments to provide seismic results and answer products that are not easily possible with presently available techniques and systems.

In some aspects, the present disclosure teaches the use of a combination of rotational seismic data, acquired by at least one rotational sensor, with translational seismic data from a spatial array to derive formation parameters such as elastic anisotropy. A spatial array of translational sensors, i.e., two or more translational sensors that are arranged in a spatially separated configuration, provides the capability to derive the spatial derivative which in combination with the rotational element gives an improved technique for formation parameter analysis as discussed in further detail hereinafter. The disclosure contemplates various arrangements of the sensors For example, the translational and rotational sensors may be deployed along a vertical or a horizontal borehole at different depths as desirable or necessary. The sensors may also be configured in a sensor package of a tool such as Schlumberger's Versatile Seismic Imager ("VSI"). The translational sensor array may comprise combinations of three-component (3C) geophones or accelerometers as desirable or necessary based on the operational circumstances.

In other aspects of the present disclosure, the formation analysis techniques utilize a combination of one or more rotational sensors and one or more translational sensors to derive measurements of shear-wave splitting. As discussed in further detail below, the combination of at least one rotational sensor with a translational sensor, such as a three-component (3C) geophone, provides the capability to obtain shear-wave splitting measurements without the necessity of a geophone array as is typically required in conventional shear-wave measurement techniques.

Methods and systems disclosed herein are directed at the deployment of seismic receiver instruments in boreholes traversing subterranean formations to monitor key formation parameters that are derived from rotational and translational components of seismic wavefield measurements. The receiver instruments may comprise a set of rotational sensors and at least one three-component (3C) geophone packaged in a shuttle with a plurality of shuttles in an array spaced along the borehole.

In certain embodiments herein, a system for taking seismic measurements relating to subterranean formations comprises a tool configured or designed for deployment at at least one depth in a borehole traversing a subterranean formation. The tool includes at least one rotational sensor configured or designed for sensing rotational components of a seismic wavefield and at least one translational sensor configured or designed for sensing translational components of a seismic wavefield. A computer in communication with the tool is provided, and a set of instructions executable by the computer that, when executed, process the seismic measurements and derive parameters relating to the formation based on the seismic measurements.

In one aspect of the present disclosure, the system may comprise one or more sources configured or designed for generating a seismic wavefield. The one or more sources may be located at the surface adjacent the borehole traversing the subterranean formation and the system may be configured for Vertical Seismic Profile (VSP) data acquisition. In other aspects of the present disclosure, the one or more sources may be located in an adjacent borehole traversing the subterranean formation and the system may be configured for crosswell data acquisition. In yet other aspects herein, the one or more sources may be located in the same well as the sensors.

In some embodiments, the system may be configured for seismic-while-drilling data acquisition. In other embodiments, the system may be configured or designed for passive seismic monitoring. In yet other embodiments, the system may be configured or designed for active seismic monitoring. In certain embodiments of the present disclosure, the system may comprise a conveyance configured for movement of the tool in the borehole traversing the subterranean formation; a retainer configured or designed for permanent or semi-permanent deployment in the borehole to retain the tool in the borehole and, when deployed, being acoustically coupled to the borehole; and/or a coupling assembly configured for coupling the tool with the subterranean formation.

In some aspects of the present disclosure, the at least one translational sensor may comprise one or more of a geophone and/or an accelerometer. The at least one translational sensor may comprise a three-component (3C) geophone. The at least one rotational sensor may comprise three rotational sensors configured or designed for sensing only rotational components of a seismic wavefield. In other aspects of the present disclosure, the tool comprises a plurality of shuttles arranged along the borehole, at least one shuttle comprising at least one 3C geophone and at least one set of three rotational sensors configured or designed for sensing only rotational components of a seismic wavefield.

In one embodiment, the system includes a controller section operably connected to the tool and configured to adjust data acquisition parameters; a communications interface operably connected to the controller; and a processing unit, wherein the tool is configured to transmit electrical signals through the controller section and the communications interface to the processing unit, and the processing unit is configured to perform signal processing using the electrical signals from the tool. The controller may be configured to control one or more sources such that signals are generated at intervals of depth of the tool. In further embodiments herein, the derived parameters relating to the formation comprise one or more of anisotropy of the subterranean structures around the tool and shear-wave splitting measurements.

The present disclosure provides a tool configured for deployment at at least one depth in a borehole traversing a subterranean formation. The tool comprises a plurality of shuttles arranged along the borehole. At least one shuttle has at least one set of three rotational sensors configured or designed for sensing only rotational components of a seismic wavefield and at least one translational sensor configured or designed for sensing translational components of a seismic wavefield, wherein the at least one translational sensor comprises a three-component (3C) geophone.

A method for taking seismic measurements relating to subterranean formations is provided. The method comprises deploying a tool at at least one depth in a borehole traversing a subterranean formation. Utilizing the tool comprising at least one rotational sensor configured or designed for sensing rotational components of a seismic wavefield and at least one translational sensor configured or designed for sensing translational components of a seismic wavefield to detect rotational and translational components of a seismic wavefield. The seismic measurements are processed to derive parameters relating to the formation based on the rotational and translational components in the seismic measurements. In some aspects, the derived parameters relating to the formation may comprise one or more of slowness of the subterranean structures around the tool and shear-wave splitting measurements.

Additional advantages and novel features will be set forth in the description which follows or may be learned by those skilled in the art through reading the materials herein or practicing the principles described herein. Some of the advantages described herein may be achieved through the means recited in the attached claims.

THE DRAWINGS

The accompanying drawings illustrate certain embodiments and are a part of the specification. Together with the following description, the drawings demonstrate and explain some of the principles of the present invention.

Figure 8:
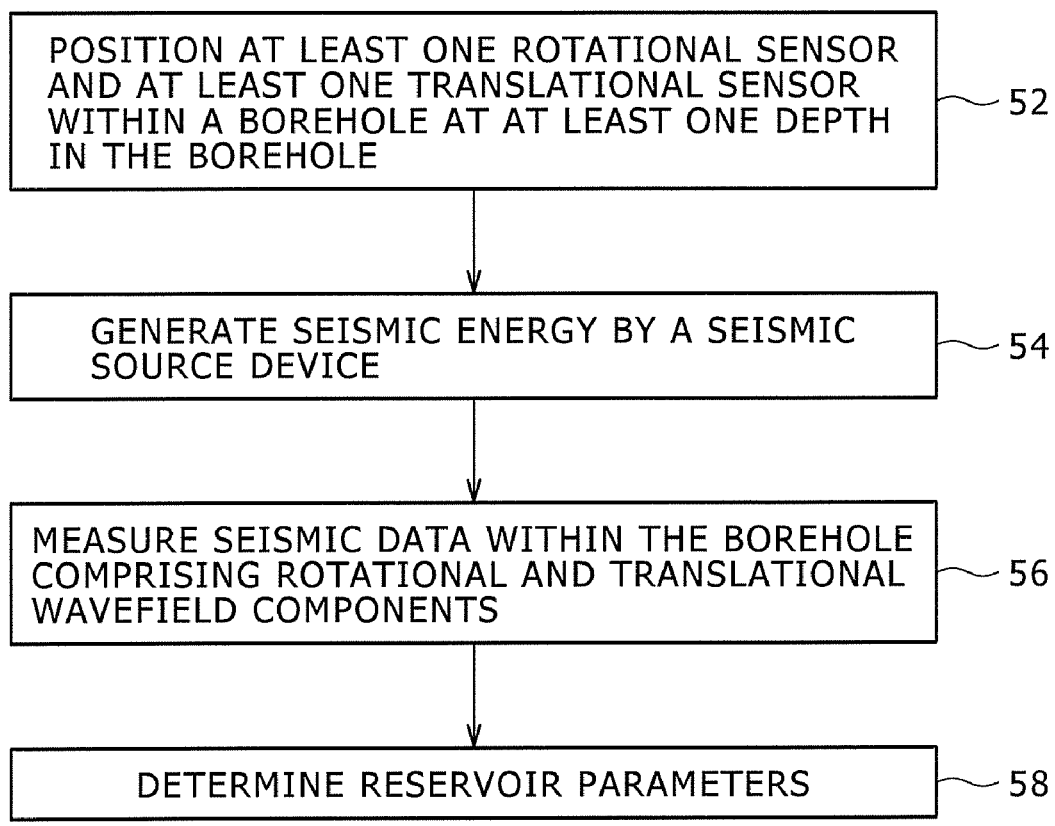

FIG. 8 outlines steps in one method according to the present disclosure.

Throughout the drawings, identical reference numbers and descriptions indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Figure 1A:
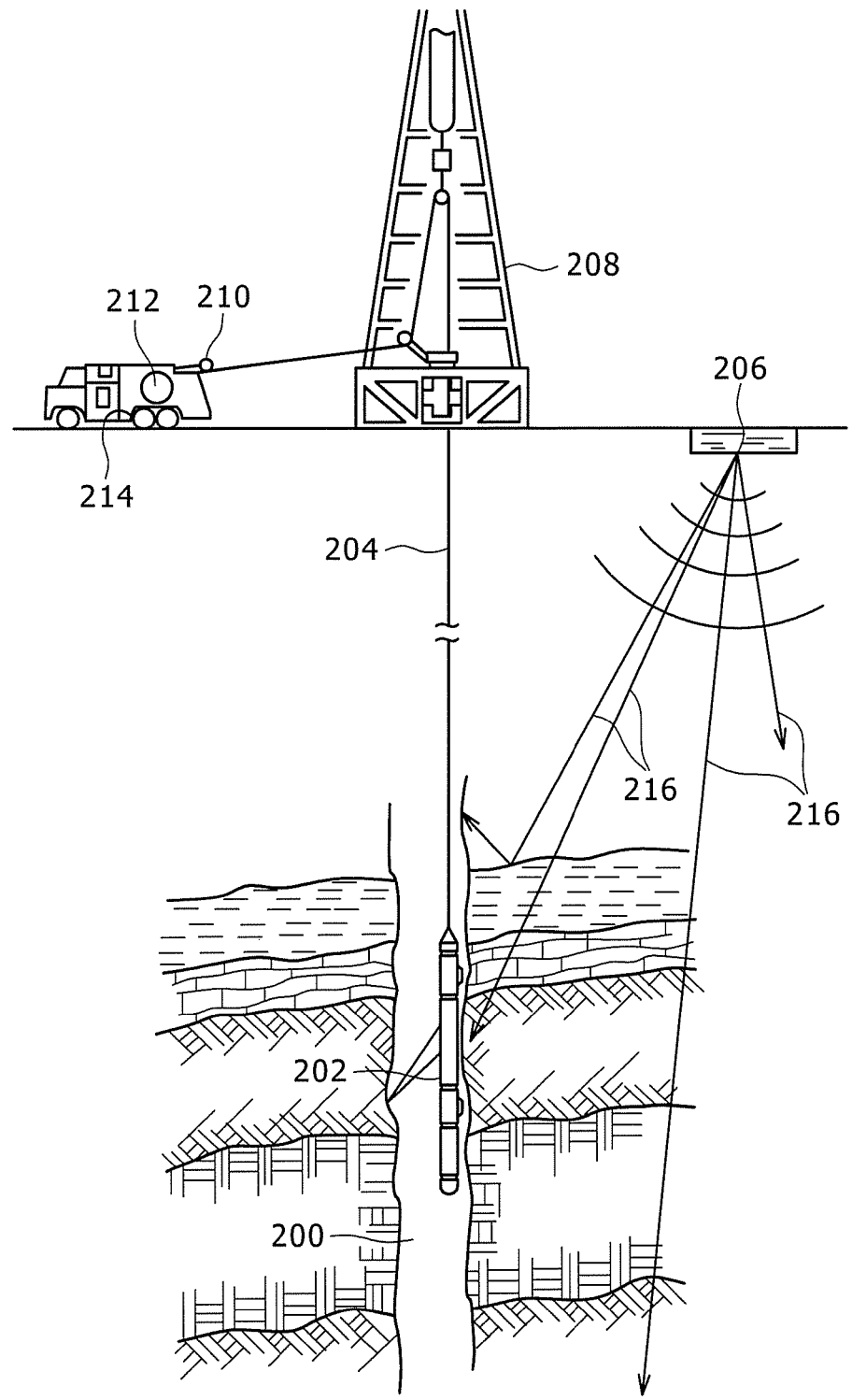
FIG. 1A illustrates schematically one exemplary operational context of the present disclosure with an exemplary borehole system for monitoring subterranean formations according to the principles described herein.

Referring to FIG. 1A, as mentioned above it is desirable to use seismic information to develop maps or images of underground features using a seismic source 206 generating seismic wavefield 216. In this, the source of seismic energy may be a controlled seismic source or a passive seismic source. Seismic energy propagating through subterranean formations is used to determine the geological characteristics of the underground strata in the region surrounding the well 200 in which a seismic sensor package or sonde 202 is placed. Source 206 can be any of a plurality of controlled source types including, but not limited to, a vibrator, an airgun, or any other type of source that is known to persons of skill in the art for the purposes described herein. Receiver instruments or sensors of the sonde 202 detect these seismic waves after they have traveled through the underground strata. After processing, the measured waves can be used to determine the characteristics of the surfaces in the strata through which they have traveled.

Borehole seismic measurements typically use three-component (3C) geophones (or accelerometers) which measure translational movements of the earth in three orthogonal directions. These measurements use several sets of three-component geophones arranged at different depths in the borehole forming an array. The resulting survey is typically referred to as a Vertical Seismic Profile (VSP). From these borehole seismic measurements it is possible to derive various elastic properties, i.e., parameters, of the subsurface which can be used in, for example, exploration and development of hydrocarbon reservoirs, $CO_2$ sequestration, water reservoir monitoring, among other applications that are known to those skilled in the art. One set of properties that can be measured is that of elastic anisotropy which describes the directional variation of the seismic wave properties. Such measurements are important since if these variations are neglected during data processing they can cause sub optimal results.

Figure 1B:
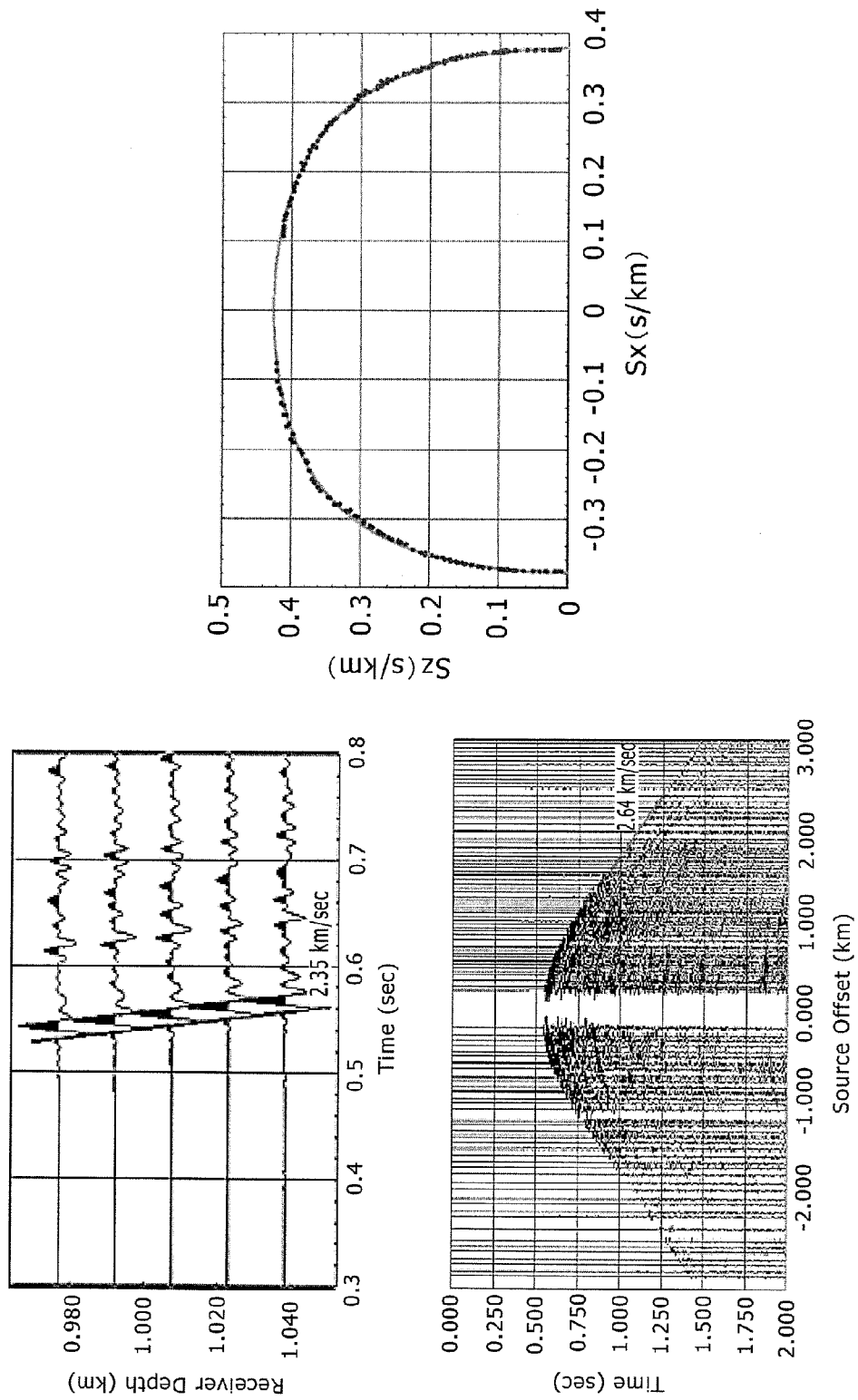
FIG. 1B shows a conventional method of computing slowness curves using walkaway VSP data.

One way to measure elastic anisotropy is to use a walkaway VSP where a seismic source is progressively moved away from the well while the receivers are kept stationary in the borehole. In the case that the sub-surface structure is essentially flat so called slowness curves can be constructed by differentiating the arrival times of the seismic wave arrivals with respect to depth and offset (note FIG. 1B). In FIG. 1B, one conventional method of computing slowness curves using walkaway VSP data is depicted in which travel times are picked for the direct P-wave arrival and are differentiated with respect to depth (top left) and offset (bottom left). When the horizontal and vertical slowness are cross-plotted the slowness curves are reconstructed (right). In the case that the receiver array is located in an anisotropic region the slowness curve will be distorted from a circle, and furthermore, this measured slowness curve can then be matched to theoretical slowness curves to give quantitative estimates of anisotropy. Such processing techniques are described in, for example, Miller, D. E., and Spencer, C., 1994, "An exact inversion for anisotropic moduli from phase slowness data", J. Geophys. Res., 99, 21651-21657. However, the application of this method is limited by the assumption of near horizontal layering in the region between the receiver and the source. In this, one object of the present disclosure is to provide an improved technique for constructing such slowness curves which does not require such an assumption.

Figure 2:
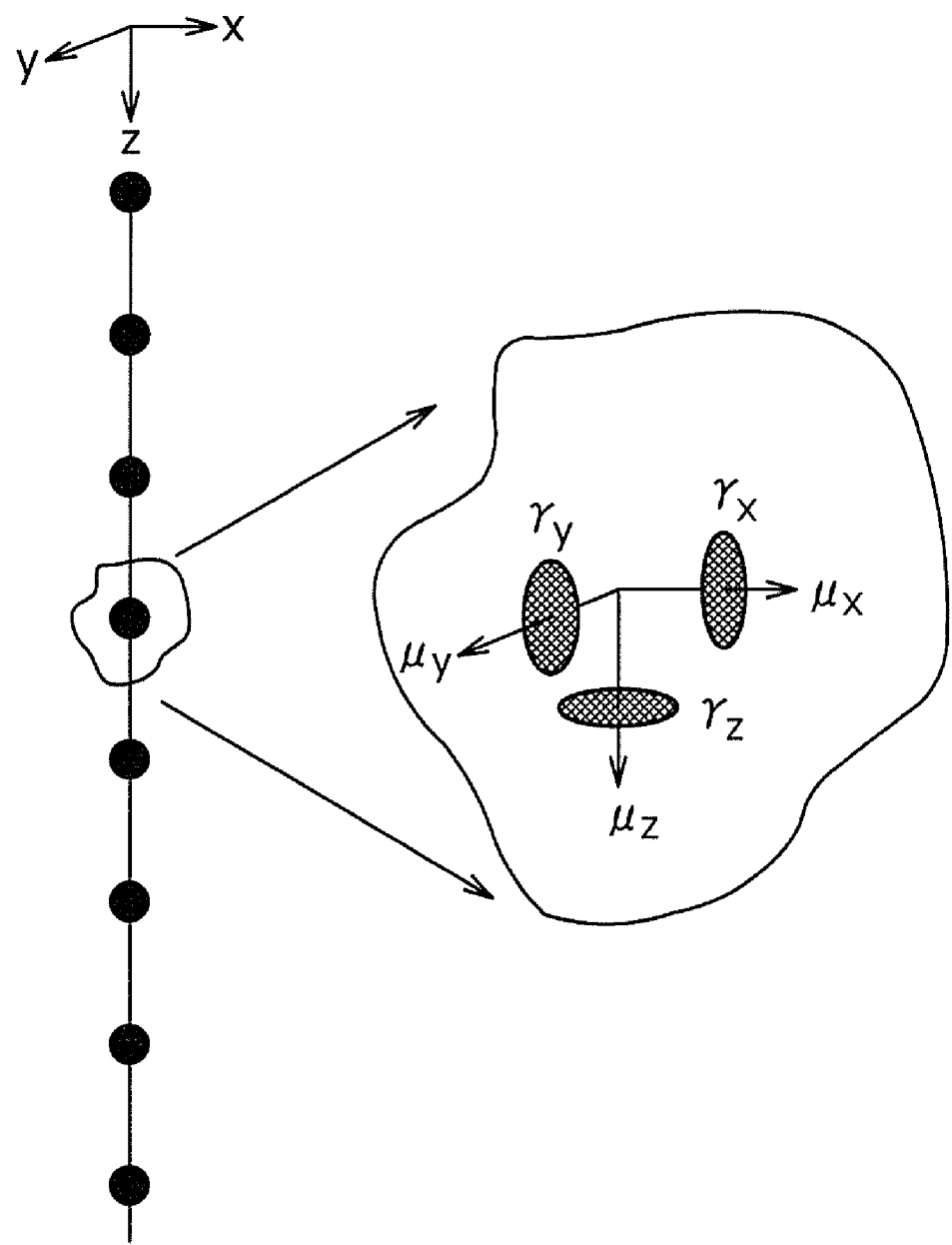
FIG. 2 is a schematic representation of one possible borehole arrangement of rotational and translational sensors in arrayed shuttles.

FIG. 2 is a schematic depiction of one possible arrangement of rotational and displacement sensors 202 in an array. At each level in the array (shown as black circles) there may be, for example, at least three rotational motion sensors and three translational motion sensors. The seismic sensor array is usually suspended from a cable 204 which also conveys from the surface the power to operate the sensors and associated downhole electronics, and to the surface various signals from the sensors.

Referring also to FIG. 1A, the signal 216 propagates throughout the formation to sensors 202. A clock measures the time of generation of the seismic signal 216 and the time of receipt of the signal at receiver(s) 202. As used herein, the terms "receiver" and "sensor" include any suitable device that is configured for detection of source signals and associated noise for the purposes described herein. In aspects of the present disclosure, seismic measurements are acquired from a receiver array comprising both 3-component geophone sensors or accelerometers and 3-component rotational sensors deployed in a borehole. Rotational sensors of the type described herein may include sensors that are based on, for example, ring laser angular rotation sensor technology, magnetohydrodynamics (MHD) sensor technology, and rotating coil type sensors. In this, various types of rotational sensors may be developed and utilized for the borehole seismic applications of the type described herein.

In some embodiments herein, the measurements are used to extract slowness components of a seismic wavefield which can then be inverted to obtain estimates of the anisotropy around the receivers. In other embodiments, the measurements derived from a combination of rotational and geophone sensors deployed in a borehole can be used to measure shear-wave splitting. In this, as also described in further detail below, the present disclosure provided techniques for obtaining shear-wave splitting measurements without the necessity of an array of sensors. Shear-wave splitting can be reliably measured in anisotropic formations using waveforms generated by two orthogonal shear-wave sources recorded on two orthogonal receiver components. The resulting data can be arranged in a 2×2 data matrix which can then be processed to determine the fast and slow shear wave directions and the time delay between the arrivals. The two shear-wave velocities can then be derived using an array of such measurements. In this, the present disclosure teaches that an additional recording of two orthogonal rotational sensors allows the measurements of shear-wave velocities at a single level without the use of a spatially spaced receiver array.

The present disclosure contemplates application of the principles herein to various areas, such as wireline, seismic-while-drilling, permanent monitoring, hydro-fracture monitoring, production logging, among others. The systems and methods disclosed may be utilized for active or passive seismic monitoring in connection with oil and gas exploration and development, $CO_2$ sequestration, water reservoirs, and microearthquakes. In this, the receiver equipment disclosed herein may be deployed in boreholes on land or in the sea.

In FIG. 1A, borehole 200 may be a previously drilled well, such as a production well or a monitoring well, with the sensor shuttle 202 that is used to acquire translational and rotational components of a seismic wavefield 216. Although one shuttle is depicted in FIG. 1A, a series of shuttles may be provided as desirable or necessary (note FIG. 2). The source 206 may be any type of suitable instrumentation for generating the desired controlled signals, or the source of the seismic signals may be microearthquakes induced by fracturing propagating through underground strata. The seismic signals 216 propagate through the formation, and some signals reach the sensor shuttle 202 having one or more receiving devices for detecting the seismic signals. The sensor arrangement 202 and the associated receiving devices may be used as the primary apparatus for collecting the seismic measurements, as described in greater detail below. One or more clocks are used to measure the exact time that the signals 216 are generated and when the signals are detected at the one or more receiving device.

In one embodiment, a suitable cable 204, for example, a wireline, slickline, or other conveyance that is configured for data telemetry, is provided for communication uphole with a controller module 214 on the surface of the borehole. The analysis module 214 may be a stand alone, or may be integrated into a field vehicle as shown in one example of FIG. 1A.

According to the principles described herein, the shuttle section(s) may be moved through the borehole 200 by winch 210, via a suitable arrangement in the drilling tower 208. A device 212 may be used to record the depth of the section 202. In one embodiment, the section 202 may be lowered to a predetermined depth in the borehole 200 and then the winch 210 pulls the conveyance 204, and thus the section 202, up through the borehole 200.

Figure 3A:
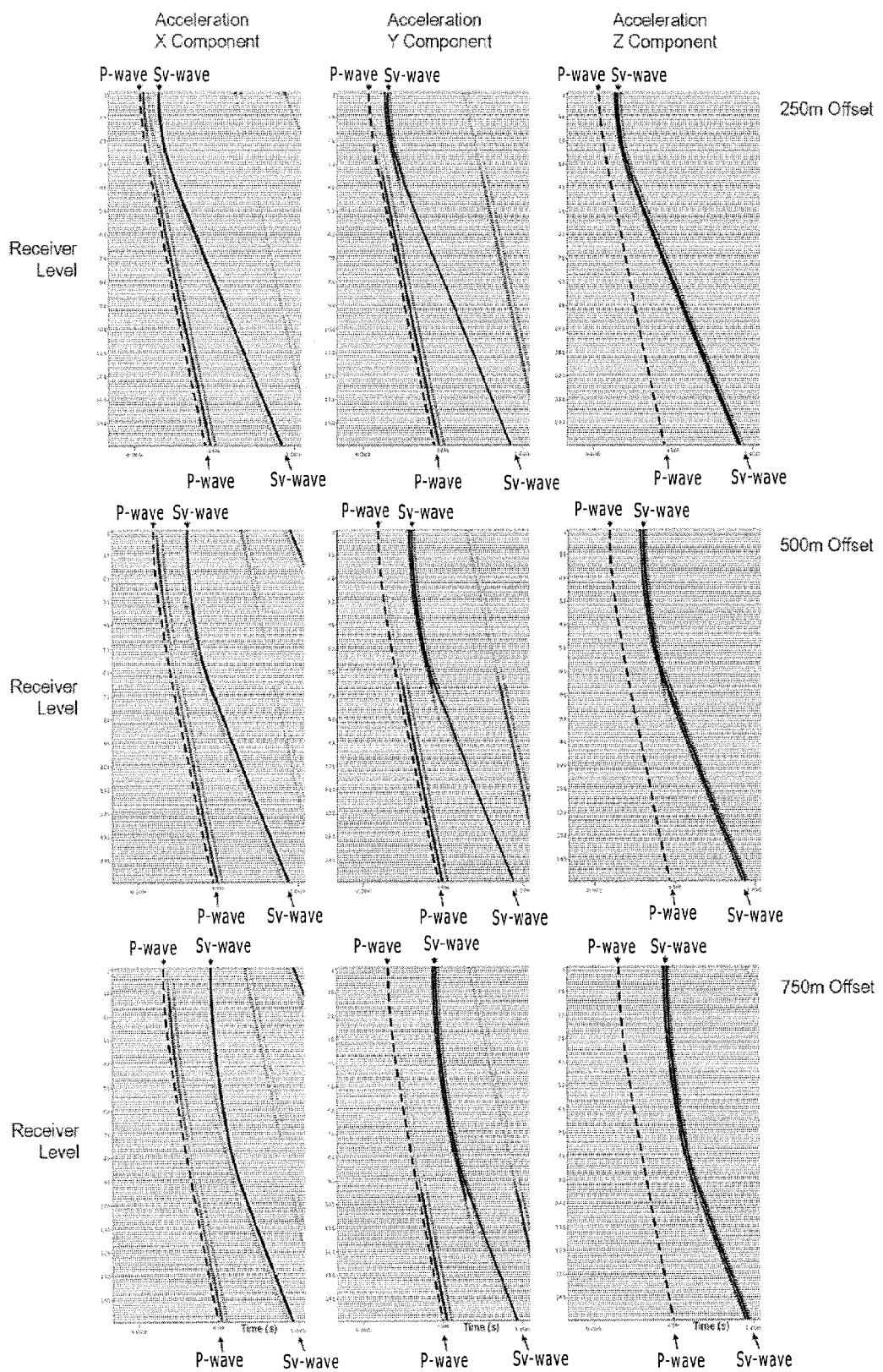
FIG. 3A shows synthetic seismic waveforms generated using 2D finite difference modeling showing results for a vertical force located at (top) 250 m, (middle) 500 m and (bottom) 750 m from a vertical receiver array. Direct P and SV wave arrivals are indicated.
Figure 3B:
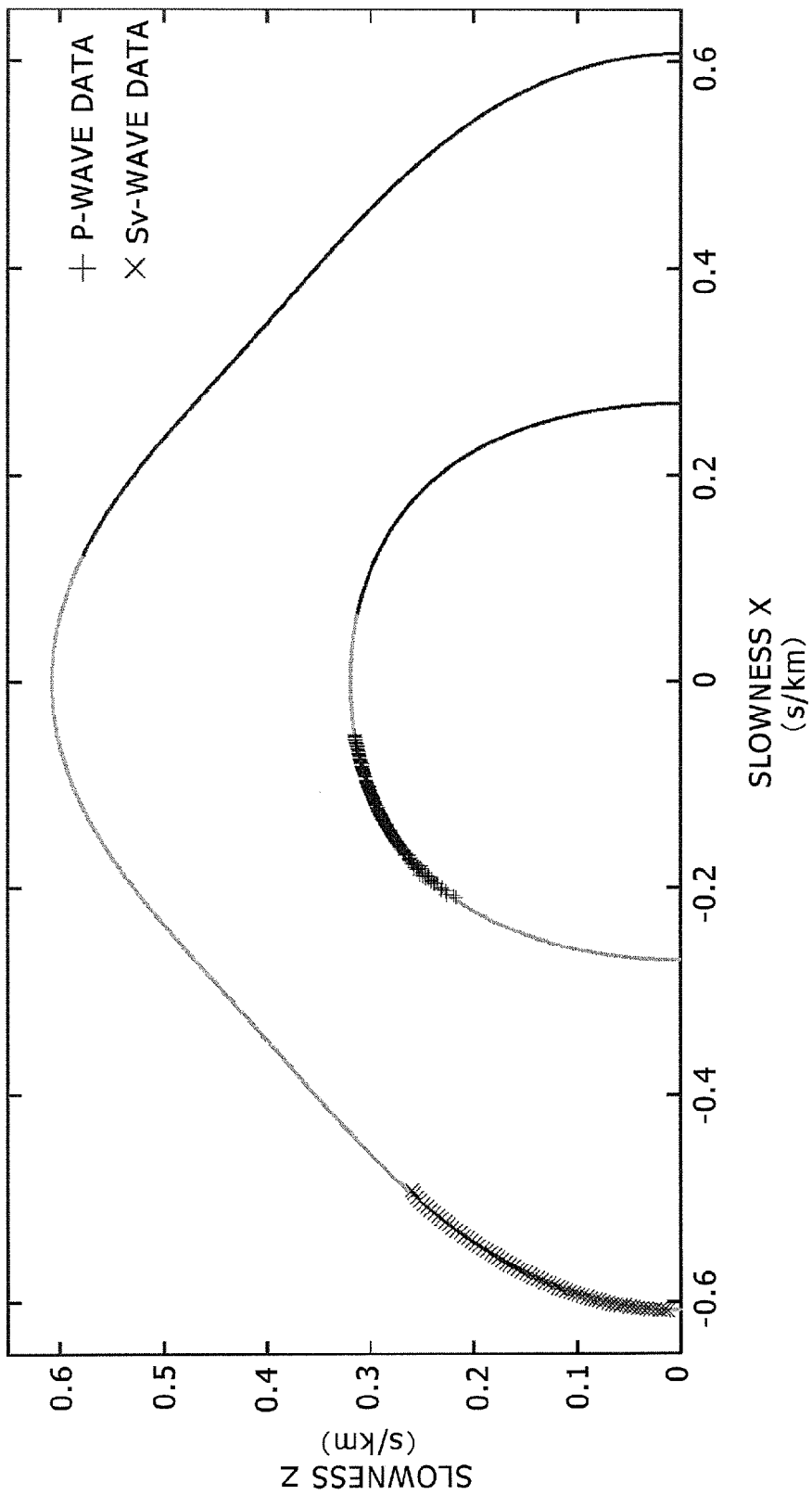
FIG. 3B is a graphical representation of recovered slowness data using the combined rotational and translational array data. Data derived from the P-wave arrivals and data derived from the SV-wave arrivals are marked.

FIG. 3A depicts synthetic seismic waveforms generated using 2D finite difference modeling showing results for a vertical force located at (top) 250 m, (middle) 500 m and (bottom) 750 m from a vertical receiver array. Each seismogram panel shows x and z component acceleration recordings (left and middle columns) and the y-component of the rotation rate. In FIG. 3B, recovered slowness data using the combined rotation and acceleration array data are illustrated. The black continuous lines show the theoretical P- and SV-wave slowness curves. Overlain on the theoretical curves are the computed slowness data for the P-waves and the computed slowness for the SV-waves. These measured slowness points appear as darker portions overlying the theoretical (correct) slowness curves.

As previously discussed, measurements of slowness components can be obtained from walkaway and 3D VSPs. In these cases, the arrival times of the direct P-wave arrivals are picked and then differentiated with respect to offset and depth to yield horizontal and vertical slowness components. Note again FIG. 1B. If these quantities are then cross-plotted against each other they can be used to reconstruct a slowness curve which is characteristic of the elastic anisotropy around the receiver array. However, such methods are subject to several limitations. One limitation is that the technique is limited to velocity structures which are essentially plane layered. Another limitation is that the technique relies on accurate travel time picks.

The present disclosure provides a combination of at least one rotational sensor and at least one displacement sensor configured or designed to form an array that can yield estimates of the slowness vector which can be inverted to derive estimates of seismic anisotropy. In some embodiments disclosed herein, a sensor package or sonde may have an array of a 3C geophone and 2 or 3 rotational sensors arranged for receiving rotational and translational components of seismic wavefields. Note again FIG. 2. In this, the techniques described herein are not limited by overburden complexity, and there are no requirements for accurate travel time picking.

The present applicant noted that there is a relationship between the rotational and translational components of a seismic wavefield. These relationships are based on spatial derivates, i.e., how the wavefield changes from one point in space to another. As discussed in more detail below, the relationship can be shown to take the following form:

$$s_x = -\frac{i}{\omega a_z}\left(2r_y - \frac{\Delta u_x}{\Delta z}\right) \quad \text{Equation 1}$$

$$s_y = +\frac{i}{\omega a_z}\left(2r_x + \frac{\Delta u_y}{\Delta z}\right) \quad \text{Equation 2}$$

where $\alpha_z$ are the amplitudes of the seismic displacement wavefield measured on the z-geophone component, $r_x$ and $r_y$ are the rotational components of the seismic wavefield as measured about the x and y directions, $(\Delta u_x/\Delta z, \Delta u_y/\Delta z)$ are measurements describing how the horizontal wavefield displacement changes in depth and $\omega$ is the angular frequency, i.e., $\omega=2\pi f$, where f is frequency.

Since it is possible to measure all of the quantities on the right hand side of Equations 1 and 2 using a combination of rotational sensors to measure $r_x$ and $r_y$ and, for example, a 3-component geophone array to measure $\alpha_z$, $\Delta u_x/\Delta z$, $\Delta u_y/\Delta z$, the horizontal slownesses $s_x$ and $s_y$ can be calculated. The remaining component of vertical slowness ($s_z$) can be derived from the geophone array. Thus a 6-component array may be used to extract the three components of the slowness vector which can then be inverted to yield estimates of the seismic anisotropy around the receiver array.

A description of the full seismic wavefield requires both a translational displacement vector, $\vec{U}=(u_x\ u_y\ u_z)^T$, and also a rotational displacement vector, $\vec{R}=(r_x\ r_y\ r_z)^T$. The rotational displacement vector is related to the translational displacement vector through the vector differential curl operator:

$$\vec{R} = \frac{1}{2}\nabla \to \vec{U} \quad \text{Equation 3}$$

Explicitly writing the rotation vector components in terms of the spatial derivatives of the displacement vector wavefield gives:

$$r_x = \frac{1}{2}\left(\frac{\partial u_z}{\partial y} - \frac{\partial u_y}{\partial z}\right) \quad \text{Equation 4}$$

$$r_y = \frac{1}{2}\left(\frac{\partial u_x}{\partial z} - \frac{\partial u_z}{\partial x}\right) \quad \text{Equation 5}$$

$$r_z = \frac{1}{2}\left(\frac{\partial u_y}{\partial x} - \frac{\partial u_x}{\partial y}\right) \quad \text{Equation 6}$$

In Equations 4 to 6 above, the vertical derivatives, i.e., $\partial u_x/\partial z, \partial u_y/\partial z$, can be derived from a vertical array of translational motion sensitive transducers such as geophones, accelerometers, and the like.

The general equation of a polarized plane wavefield can be written as:

$$\vec{U} = \vec{A}e^{i\omega(t-\vec{S}\cdot\vec{X})} \quad \text{Equation 7}$$

where $\vec{A}=(\alpha_x\ \alpha_y\ \alpha_x)^T$ is the polarization amplitude of the seismic wavefield, $\omega$ is the angular frequency, i.e., $\omega=2\pi f$, where f is frequency, $\vec{S}=(s_x\ s_y\ s_z)^T$ is the slowness vector, and $\vec{X}=(x\ y\ z)^T$ is the spatial position vector.

By computing the horizontal derivatives that appear in the expressions for the rotational vector, i.e., $\partial u_z/\partial x$, $\partial u_z/\partial y$ and $\partial u_y/\partial x$, $\partial u_x/\partial y$, the following are obtained:

$$\frac{\partial u_z}{\partial x} = -i\omega a_z s_x e^{i\omega(t-\vec{S}\cdot\vec{x})} \quad \text{Equation 8}$$

$$\frac{\partial u_z}{\partial y} = -i\omega a_z s_y e^{i\omega(t-\vec{S}\cdot\vec{x})} \quad \text{Equation 9}$$

$$\frac{\partial u_y}{\partial x} = -i\omega a_y s_x e^{i\omega(t-\vec{S}\cdot\vec{x})} \quad \text{Equation 10}$$

and $$\frac{\partial u_x}{\partial y} = -i\omega a_x s_y e^{i\omega(t-\vec{S}\cdot\vec{x})} \quad \text{Equation 11}$$

Referring to Equations 4 to 6 for the rotation components expressed in terms of the spatial derivatives of the displacements, and dropping the exponential harmonic term ($e^{i\omega(t-\vec{S}\cdot\vec{x})}$) which is a common factor throughout, the following are obtained:

$$s_x = -\frac{i}{\omega a_z}\left(2r_y - \frac{\Delta u_x}{\Delta z}\right) \quad \text{Equation 1 (above)}$$

$$s_y = +\frac{i}{\omega a_z}\left(2r_x + \frac{\Delta u_y}{\Delta z}\right) \quad \text{Equation 2 (above)}$$

A change in notation for the vertical derivatives from ($\partial u_x/\partial z$, $\partial u_y/\partial z$) to ($\Delta u_x/\Delta z$, $\Delta u_y/\Delta z$) is used to indicate that these quantities are derived from discrete elements in the vertical geophone array.

Since all the quantities on the right hand side can be measured from either rotational sensors ($r_x$, $r_y$) or a vertical geophone array ($\alpha_z$, $\partial u_x/\partial z$, $\partial u_y/\partial z$), it is possible to measure the horizontal components ($S_x$, $S_y$) of the slowness vector. The vertical component of the slowness vector ($S_z$) can be derived from the vertical geophone array. In consequence, a combination of rotational seismometers and a vertical geophone array can be used to compute all components of the slowness vector.

An additional constraint on the computed horizontal slownesses can be derived through a consideration of the vertical component of rotation:

$$(-a_y s_x + a_x s_y) = -\frac{2ir_z}{\omega} \quad \text{Equation 12}$$

Equations 1, 2 and 14 can be expressed in a linear form which can be solved to obtain the slowness vector either at a single frequency or at multiple frequencies:

$$\tilde{M}\cdot\vec{S}_H = \vec{D} \quad \text{Equation 13}$$

where $$\tilde{M} = \omega\begin{pmatrix} a_z & 0 \\ 0 & a_z \\ -a_y & a_x \end{pmatrix}$$

and $$\vec{D} = -i\begin{pmatrix} +2r_y - \frac{\Delta u_x}{\Delta z} \\ -2r_x - \frac{\Delta u_y}{\Delta z} \\ 2r_z \end{pmatrix}$$

and $$S_H = \begin{pmatrix} S_x \\ S_y \end{pmatrix}.$$

The linear expression given in Equation 15 above describes an over determined problem of two unknowns and three equations that can be solved to obtain the horizontal slowness components at each frequency. It is noted that more convenient forms for these expressions can be constructed from the rate of rotation, i.e., the time derivative of rotation, and the first and second time derivatives of displacement, i.e., particle velocity and acceleration. Once these slowness components are derived they can then be inverted to yield estimates of the elastic anisotropy over the receiver array.

It is also to be noted that more sophisticated signal processing techniques can make use of the combined array of rotation sensors and conventional translation sensors such as a parametric inversion or related techniques. See, for example, Esmersoy, C., 1990, "Inversion of P and SV waves from multicomponent offset vertical seismic profiles", Geophysics, 55 (1) 39-50 and Leaney, W. S., 2002, "Anisotropic vector plane wave decomposition for 3D VSP data", SEG, Expanded Abstracts, 21 (1), 2369-2372. It is likely that the application of such techniques will yield better estimates of both the horizontal and vertical slowness components as they deal with the issue of interfering wavefields.

Full waveform synthetic data were constructed to demonstrate the principles discussed above. FIG. 3A shows the waveforms for a simple homogeneous anisotropic space with anisotropic parameters described by the Thomsen anisotropy parameters of $\epsilon=0.2$ $\delta=0.0$ and $\gamma=0.0$. The seismic wavefield was simulated using a vertical force which is located at offsets of 250 m (top), 500 m (middle), and 750 m (bottom) from a vertical receiver array. This vertical receiver array extends from 10 m below the horizontal surface with 150 receivers spaced 10 m apart. At each receiver both the rotational and translational wavefield were recorded, and are shown in FIG. 3A. By applying the techniques discussed herein the slowness curves as shown in FIG. 3B were reconstructed.

Figure 4B:
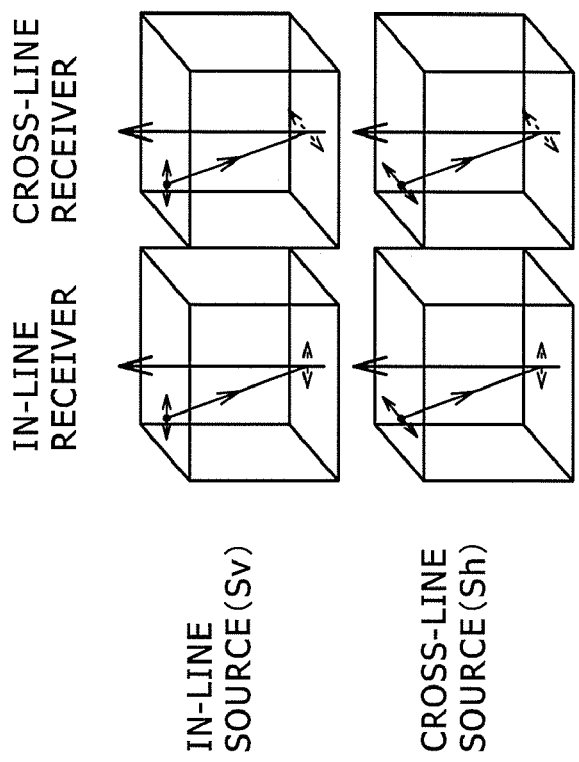
FIG. 4B is a schematic representation of one possible method used in performing a seismic survey according to the principles described herein.
Figure 4A:
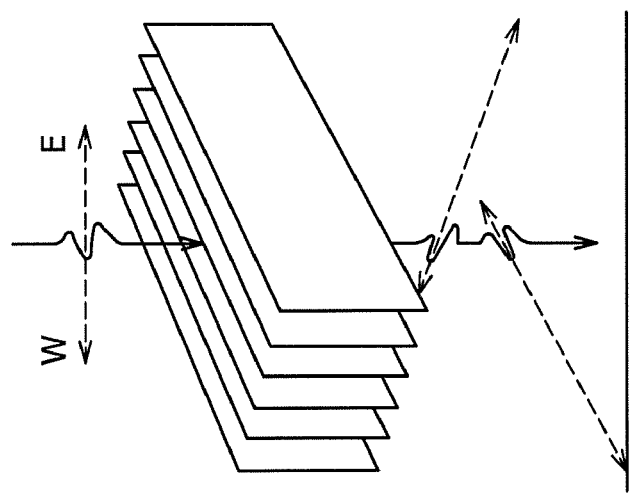
FIG. 4A is a schematic explanation of the phenomenon of shear-wave splitting.

One particularly unique signature of seismic anisotropy is the phenomenon of shear-wave splitting, also known as shear-wave birefringence. In this case, two shear-wave waves can propagate with velocities and polarizations which depend on the propagation direction. FIG. 4A is a schematic illustration showing the phenomenon of shear-wave splitting. A vertically propagating shear-wave that is polarized in the E-W direction enters an anisotropic medium where the anisotropy is caused by vertically aligned fractures striking N45E. The shear-wave splits into a fast shear-wave polarized N45E, parallel to the fracture strike, and a slow shear-wave polarized S45E, parallel to the fracture normal. The two shear-waves propagate at different velocities leading to a time delay between them. VSPs, such as zero or near offset VSPs, can be used to measure this effect with shear-wave sources on the surface of the earth, and the seismic energy is recorded downhole using an array of geophones or accelerometers. One robust way to estimate shear-wave splitting is to measure the waveforms generated by two orthogonal shear-wave sources on two orthogonal geophones (note FIG. 4B). As depicted in FIG. 4B, an in-line shear-wave source (Sv) and a cross-line shear-wave source (Sh) may be utilized to generate in-line and cross-line seismic wavefields that are recorded by corresponding receiver instrumentation. Such a configuration can be used with a VSP where in-line and cross-line shear-wave sources are deployed on the surface, and the resulting waveforms recorded downhole on, for example, a temporarily deployed receiver array. Rotation analysis, which is often referred to as the Alford rotation, can be performed on the recorded measurements. See Alford, 1986, "Shear Data in the Presence of Azimuthal Anisotropy", SEG, Expanded Abstracts.

Figure 4C:
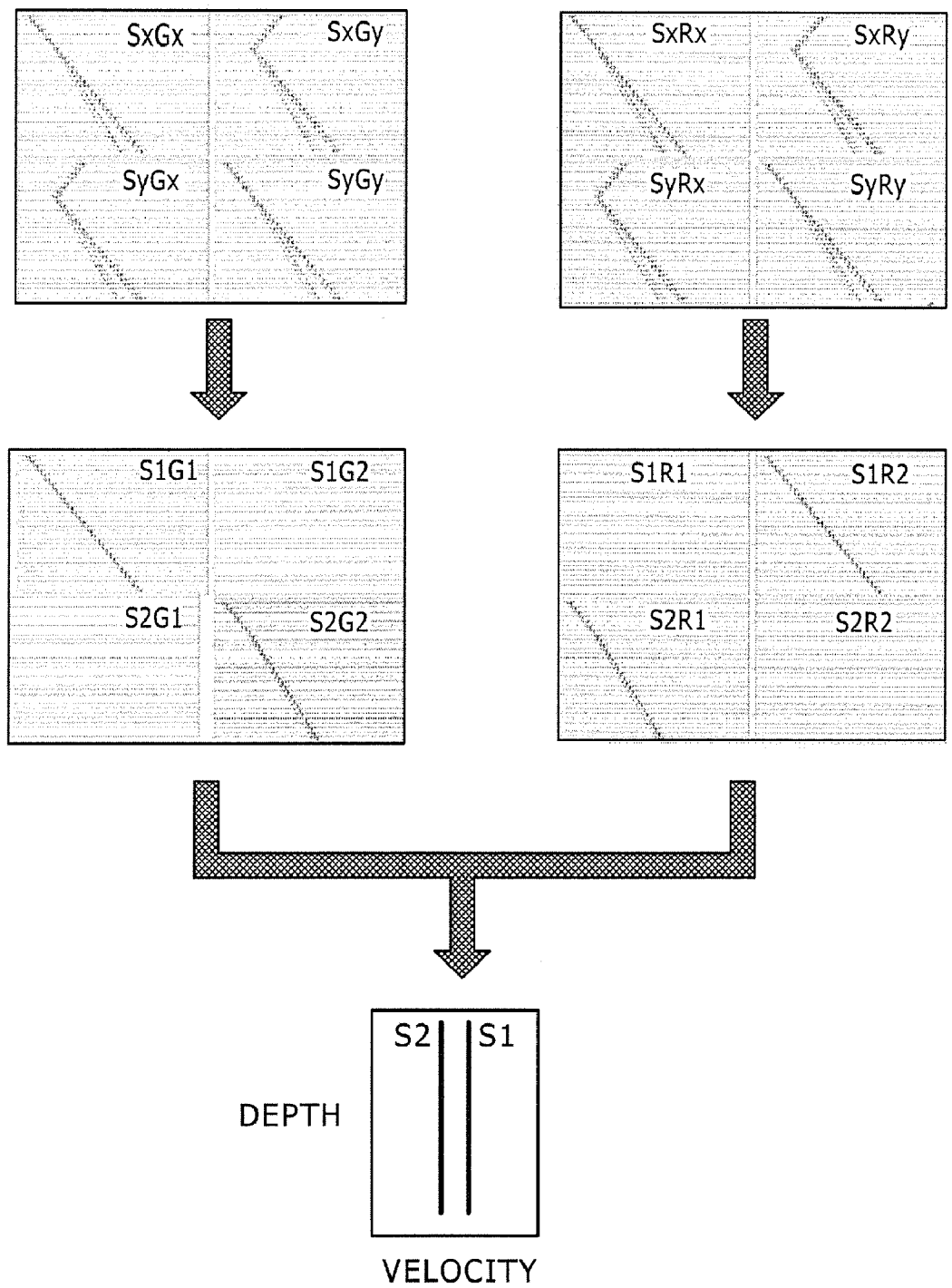
FIG. 4C is a schematic representation of one possible method for shear-wave splitting measurement according to the principles described herein.

Such rotation analyses determine the fast and slow shear-wave directions. The data can then be rotated into these directions and the time delay between the fast and slow shear-wave directions can be determined by cross-correlation. Note FIG. 4C. Such processing can be applied at several different receiver levels allowing the shear-wave speeds to be measured.

In aspects of the present disclosure, a combination of conventional seismic sensors, such as geophones or accelerometers, are combined with rotational sensors so that the shear-wave speeds can be measured at a single level without the need for a spaced receiver array. In this, the present applicant recognized that a mathematical relationship that describes the relation between rotational and translational motions could be used effectively and efficiently to derive the horizontal slowness component. See Igel, H., Flaws, A., Suryanto, W., Schuberth, B., Cochard, A., Schreiberg, U., Velikosoltsev, A., 2004, "Rotational Motions in Seismology: Theory, Instrumentation and Observations", FGS Workshop on Ring Lasers and Earth Rotations, Wettzell, Germany March 24-25. Previous techniques have used the relationship for the special case of the rotational field associated with a horizontally polarized shear wave. However, to applicant's knowledge such prior techniques do not consider or suggest the more complex situation of shear-wave splitting estimation.

In aspects of the present disclosure, a combination of rotational sensors and conventional seismic sensors is provided along with shear-wave sources to estimate shear-wave splitting attributes at a single level rather than utilizing a receiver array as is the common practice. Data are collected from the conventional seismic sensors and shear-wave sources and are processed using an Alford rotation (or equivalent) to find the fast and slow shear-wave directions of the anisotropic medium. The data from the conventional seismic data and the rotational sensors are rotated into this 'natural' co-ordinate frame. It can be shown that ratios of the conventional seismic data to the rotational data yield information of the fast and slow shear-wave velocities without the use of additional receiver levels. A schematic representation of one method for estimating shear-wave splitting is given in FIG. 4C.

Now considering vertically propagating plane shear waves in an anisotropic medium:

$$\vec{U}_F = \vec{A}_F e^{i\omega\left(t-t_F-\frac{z}{V_F}\right)} \qquad \text{Equation 16}$$

$$\vec{U}_S = \vec{A}_S e^{i\omega\left(t-t_S-\frac{z}{V_S}\right)} \qquad \text{Equation 17}$$

where $\vec{A}_S$ and $\vec{A}_F$ are the polarizations of the slow and fast shear waves; $v_S$ and $v_F$ are the vertical velocities of the slow and fast shear waves; and $t_S$ and $t_F$ are the arrival times of the slow and fast shear waves.

If the fast shear wave is polarized in the horizontal plane at an angle $\theta$ then.

$$\vec{A}_F = |A_F| \begin{pmatrix} \cos\theta \\ \sin\theta \\ 0 \end{pmatrix} \qquad \text{Equation 18}$$

and $$\vec{A}_S = |A_S| \begin{pmatrix} \cos(\theta+90) \\ \sin(\theta+90) \\ 0 \end{pmatrix} = |A_S| \begin{pmatrix} -\sin(\theta) \\ \cos(\theta) \\ 0 \end{pmatrix} \qquad \text{Equation 19}$$

Using the data from the conventional seismic sensors and the two shear-wave sources, the Alford rotation, or an equivalent processing step, is applied to derive the fast and slow shear-wave directions, $\theta$. The waveform data are rotated into this new co-ordinate frame (denoted $x_1,x_2,x_3$) thus separating the data onto two orthogonal components, such that the fast shear wave is polarized on the $x_1$ component and the slow shear wave is polarized on the $x_2$ component:

$$\vec{U}_F = A_F \begin{pmatrix} 1 \\ 0 \\ 0 \end{pmatrix} e^{i\omega\left(t-t_F-\frac{z}{V_F}\right)} \qquad \text{Equation 20}$$

and $$\vec{U}_S = A_S \begin{pmatrix} 0 \\ 1 \\ 0 \end{pmatrix} e^{i\omega\left(t-t_S-\frac{z}{V_S}\right)} \qquad \text{Equation 21}$$

The rotational displacement vector is related to the translational displacement vector through the vector differential curl operator:

$$\vec{R} = \frac{1}{2}\nabla \times \vec{U}. \qquad \text{Equation 3 (above)}$$

Explicitly writing the rotation vector components in terms of the spatial derivatives of the displacement vector wavefield gives:

$$r_1 = \frac{1}{2}\left(\frac{\partial u_3}{\partial x_2} - \frac{\partial u_2}{\partial x_3}\right) \qquad \text{Equation 22}$$

$$r_2 = \frac{1}{2}\left(\frac{\partial u_1}{\partial x_3} - \frac{\partial u_3}{\partial x_1}\right) \qquad \text{Equation 23}$$

$$r_3 = \frac{1}{2}\left(\frac{\partial u_2}{\partial x_1} - \frac{\partial u_1}{\partial x_2}\right) \qquad \text{Equation 24}$$

Using the curl operation the corresponding rotational wavefield components for the two shear waves in this co-ordinate frame are:

$$\vec{R}_F = -\frac{i\omega|A_F|}{2V_F}\begin{pmatrix} 0 \\ 1 \\ 0 \end{pmatrix} e^{i\omega\left(t-t_F-\frac{z}{V_F}\right)} \qquad \text{Equation 25}$$

and

-continued $$\vec{R}_S = -\frac{i\omega|A_S|}{2V_S}\begin{pmatrix}1\\0\\0\end{pmatrix}e^{i\omega\left(t-t_S-\frac{z}{V_S}\right)}$$ Equation 26

Combining together Equations 20 and 25, and Equations 21 and 26, describing the displacement and rotation in the 'natural' co-ordinate system, to get:

$$V_F = -\frac{i\omega u_{1F}}{r_{2F}}$$ Equation 27 and $$V_S = -\frac{i\omega u_{2S}}{r_{1S}}.$$ Equation 28

As described above, it is possible to combine data from conventional seismic sensors and rotational sensors to measure the velocities of the fast and slow shear waves without the requirement of an array.

Figure 5:
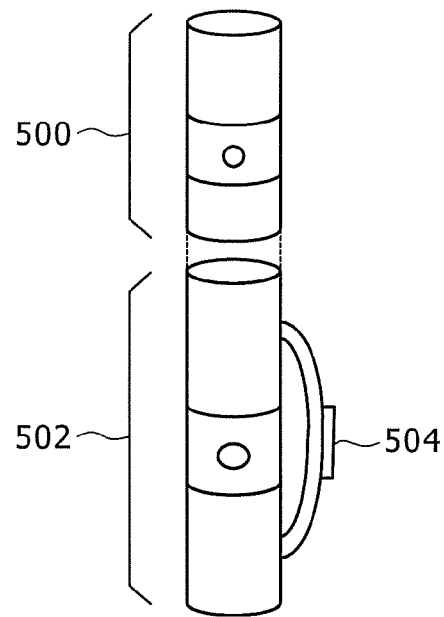
FIG. 5 is a schematic representation of some possible configurations for seismic shuttles having sensors according to the disclosure herein.

FIG. 5 shows some possible configurations for a receiver section or module according to the principles described herein. Sections 500 and 502 are examples of a tool module with a receiver section 202 such as illustrated in FIGS. 1A and 2 and described above. In this, section 500 may include one or more 3C-geophone and one or more 3C-rotational sensor that are packaged in the section 500. Section 502 includes a coupling member 504, for example, a bowspring, for coupling the receiver section to the borehole wall.

In certain instances an undesirable signal to noise ratio might be created, and tool design combined with signal processing for noise cancellation may be desirable or necessary for the purposes described herein. In addition to other sources, acoustic noise is expected from tubewaves and turbulent flows around the tool. The first approach is mechanical, essentially designing the tool to decrease noise caused by multiple source signals. Aside from these mechanical solutions, another approach is to apply algorithmic noise cancellation.

Figure 6:
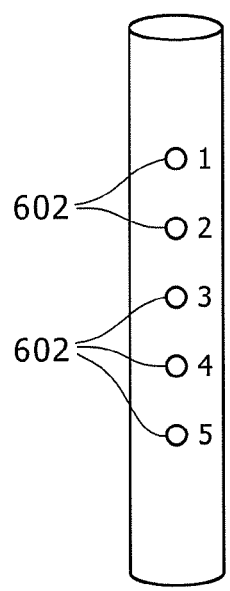
FIG. 6 is a schematic representation of yet another possible seismic sensor shuttle according to the principles discussed herein.

FIG. 6 shows another aspect of a receiver module according to the principles described herein where, for example, five receiver elements labeled 602 are spaced apart. For example, sequentially spaced receiver elements 1, 2, 4, 5 may comprise 3C-geophones and receiver element 3 may comprise a 3C-geophone and a 3C-rotational sensor. The spacing may be selected based on what is sufficient to properly acquire seismic waveform data, and other orientations and configurations for the plurality of receivers may also be used.

Figure 7:
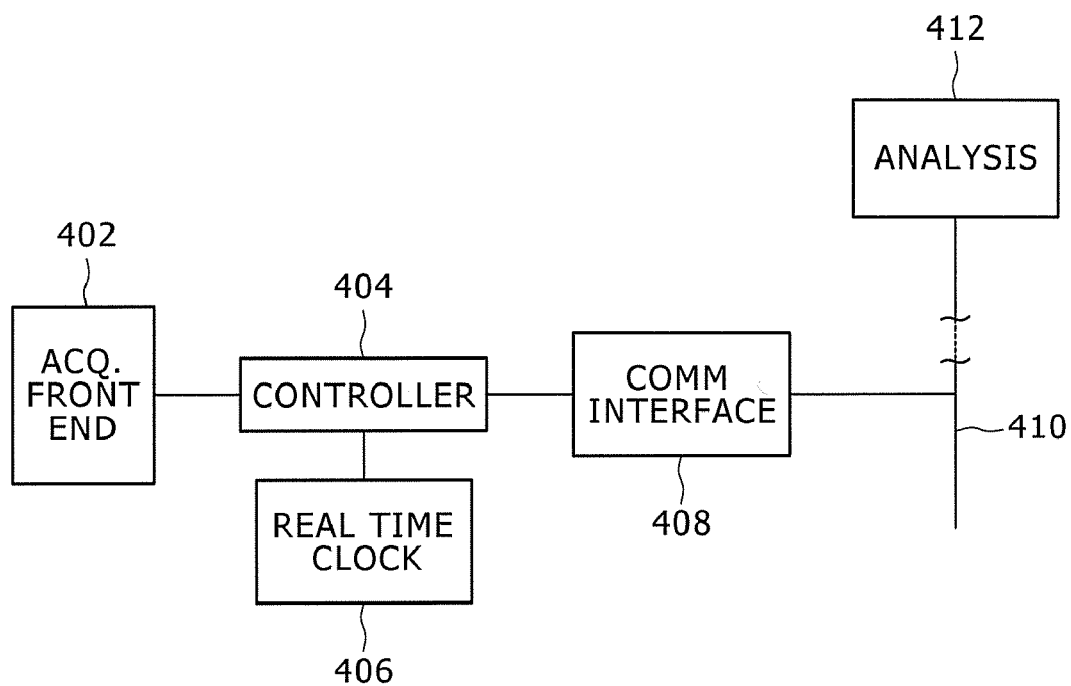
FIG. 7 is a block diagram representation of the configuration of one possible seismic acquisition system according to the principles discussed herein.

FIG. 7 shows one example of a sensor section or arrangement according to the principles discussed herein. Note, for example, FIGS. 1A and 2. The acquisition front end 402 may contain the sensor elements described above, as well as their associated connections and electronics. For example, the acquisition section 402 may include electronics suitable for the relevant or desired frequencies that are to be received by the receiving device. In this, electronics for signal conditioning and digitization may be included as known to those of skill in the art. The overall operation of the system is coordinated by controller 404. The controller is capable of adjusting the acquisition parameters for section 402 and timing the start and end of acquisition, among its other functions. A real time clock 406 may be used to provide the time to the controller for the determination of when a signal is received and for timing the appropriate collection intervals. This clock's time is used in concert with the time that the seismic signal is generated so that the travel time can be determined. Information from the controller may be sent to an analysis unit 412. In one embodiment, an analysis unit may be located at the surface of the borehole in platform 214 (note FIG. 1A).

Communications interface 408 may be used to convey the signals output from the controller 404 to communication cable 410, and subsequently to analysis unit 412. The analysis unit may perform adaptive noise cancellation as well as determination of the signal velocity for each data collection. The functions of the analysis unit may be distributed between modules at the surface and downhole, as desirable or necessary for the operations described herein.

In certain embodiments of the present disclosure, the controller 404 and the analysis unit 412 are configured to measure the depth of the sensor section at any time. One method of accomplishing this is to measure the amount of conveyance that is output by the winch 210 (note FIG. 1A). Knowing this depth, the seismic sources can be activated with the receivers at a variety of depths. This allows the system to ensure that measurements are taken at specific depths.

Referring to FIG. 8, in one method according to the present disclosure, at least one rotational sensor and at least one displacement sensor are positioned within a borehole at at least one depth (note flow diagram block 52). A suitable seismic source device is activated to generate seismic wavefield (note block 54). As previously discussed above, the present disclosure also contemplates passive seismic measurements in which seismic energy is generated by, for example, microearthquakes propagating through subterranean formations. Seismic measurements are acquired at at least one depth in the borehole (note block 56) to provide seismic information of the formation such that the measured data relate to different zones of interest in the formation.

The acquired data are processed to determine key reservoir parameters (note block 58) relating to, for example, oil production, gas production, formation structure, among others. As described above, the seismic measurements having translational and rotational components of seismic wavefields may be used to derive anisotropy of the subterranean structures around the receivers and/or shear-wave splitting measurements.

The embodiments and aspects were chosen and described in order to best explain the principles of the invention and its practical applications. The preceding description is intended to enable others skilled in the art to best utilize the principles described herein in various embodiments and with various modifications as are suited to the particular use contemplated. It is intended that the scope of the invention be defined by the following claims.

What is claimed is:

1. A system for taking seismic measurements relating to subterranean formations, comprising:
a tool configured or designed for deployment at at least one depth in a borehole traversing a subterranean formation, the tool comprising at least one rotational sensor in an array comprising translational seismic sensors, the at least one rotational sensor and the translational seismic sensors configured or designed for acquiring seismic measurements of a seismic wavefield;
a computer in communication with the tool, the computer configured to:
process the seismic measurements; and
derive parameters relating to the formation based on the seismic measurements wherein the derived parameters relating to the formation comprise one or more of slowness and shear-wave splitting measurements.

2. The system of claim 1, further comprising:
one or more sources configured or designed for generating the seismic wavefield.

3. The system of claim 2, wherein the one or more sources are located at the surface adjacent the borehole traversing the subterranean formation; and
the system is configured for Vertical Seismic Profile (VSP) data acquisition.

4. The system of claim 2, wherein the one or more sources are located in an adjacent borehole traversing the subterranean formation; and
the system is configured for crosswell data acquisition.

5. The system of claim 2, wherein the one or more sources are located in the borehole having the sensors; and
the system is configured for single well data acquisition.

6. The system of claim 1, wherein the system is configured for seismic-while-drilling data acquisition.

7. The system of claim 1, wherein the system is configured or designed for passive seismic monitoring.

8. The system of claim 1, wherein the system is configured or designed for active seismic monitoring.

9. The system of claim 1, further comprising:
a conveyance configured for movement of the tool in the borehole traversing the subterranean formation.

10. The system of claim 1, further comprising:
a retainer configured or designed for permanent or semi-permanent deployment in the borehole to retain the tool in the borehole and, when deployed, being acoustically coupled to the borehole.

11. The system of claim 1, further comprising:
a coupling assembly configured for coupling the tool with the subterranean formation.

12. The system of claim 1, wherein the array comprising translational sensors comprises one or more three-component geophone or accelerometer.

13. The system of claim 1, wherein the at least one rotational sensor comprises at least two rotational sensors.

14. The system of claim 13, wherein the seismic measurements of a seismic wavefield comprise a fast shear wave velocity or slowness and a slow shear wave velocity or slowness based on data acquired by at least two of the at least two rotational sensors and data acquired by at least two of the translational seismic sensors.

15. The system of claim 1, wherein the at least one rotational sensor comprises three rotational sensors.

16. The system of claim 1, wherein the tool comprises at least one shuttle comprising an array of translational sensors and at least two rotational sensors.

17. The system of claim 1, wherein the tool comprises a plurality of shuttles arranged in an array, at least one shuttle comprising at least one 3C geophone and at least one set of three rotational sensors.

18. The system of claim 1, further comprising:
a controller section operably connected to the tool and configured to adjust data acquisition parameters;
a communications interface operably connected to the controller;
a processing unit, wherein the tool is configured to transmit electrical signals through the controller section and the communications interface to the processing unit, and the processing unit is configured to perform signal processing using the electrical signals from the tool.

19. The system of claim 18, wherein the controller is further configured to control one or more sources such that signals are generated at intervals of depth of the tool.

20. The system of claim 1, wherein the seismic measurements of a seismic wavefield comprise at least one shear wave velocity or slowness based on data acquired by at least one of the at least one rotational sensor and data acquired by at least one of the translational seismic sensors.

21. A system for taking seismic measurements relating to subterranean formations, comprising:
a tool configured or designed for deployment at at least one depth in a borehole traversing a subterranean formation, the tool comprising at least two rotational sensors and at least two translational seismic sensors, the at least two rotational sensors and the at least two translational seismic sensors configured or designed for acquiring seismic measurements of a seismic wavefield;
a computer in communication with the tool, the computer configured to:
process the seismic measurements; and
derive parameters relating to the formation based on the seismic measurements wherein the derived parameters relating to the formation comprise one or more of slowness and shear-wave splitting measurements.

22. A tool configured for deployment at at least one depth in a borehole traversing a subterranean formation, comprising:
a plurality of shuttles arranged in an array, at least one shuttle having at least one set of three rotational sensors in an array comprising translational sensors, the at least one set of three rotational sensors and the translational sensors configured for acquiring seismic measurements of rotational and translational components of a seismic wavefield in a subterranean formation, wherein the translational sensors comprise three-component (3C) geophones or accelerometers, and wherein the seismic measurements of rotational and translational components of a seismic wavefield characterize shear-wave splitting in the subterranean formation.

23. A method for taking seismic measurements relating to subterranean formations, comprising:
deploying a tool at at least one depth in a borehole traversing a subterranean formation, the tool comprising at least one rotational sensor in an array comprising translational sensors, the at least one rotational sensor and the translational sensors configured for detecting rotational and translational components of a seismic wavefield, respectively;
detecting, as seismic measurements, rotational and translational components of the seismic wavefield;
processing the seismic measurements; and
deriving parameters relating to the formation based on the rotational and translational components in the seismic measurements wherein the derived parameters relating to the formation comprise one or more of slowness and shear-wave splitting measurements.

* * * * *